(12) United States Patent
DeCusatis

(10) Patent No.: US 8,992,024 B2
(45) Date of Patent: Mar. 31, 2015

(54) THREE DIMENSIONAL IMAGE PROJECTOR WITH CIRCULAR LIGHT POLARIZATION

(75) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/357,767

(22) Filed: Jan. 25, 2012

(65) Prior Publication Data
US 2013/0188150 A1    Jul. 25, 2013

(51) Int. Cl.
*G03B 21/28* (2006.01)
*G02B 1/10* (2006.01)
*G02B 27/14* (2006.01)
*G02B 6/27* (2006.01)
*G02B 5/12* (2006.01)

(52) U.S. Cl.
CPC ... *G02B 6/27* (2013.01); *G02B 5/12* (2013.01)
USPC ............. 353/20; 353/81; 353/98; 348/57; 2/583; 2/629; 2/634; 2/251

(58) Field of Classification Search
CPC .. G02B 27/1033; G02B 27/149; G02B 27/26; G02B 5/12; G02B 19/0019; G02B 2006/12104; G02B 6/27; G02B 27/4261; H04N 9/3197; H04N 9/3167; H04N 9/3164; G03B 21/2013; G03B 21/2066; G03B 21/28; F21V 9/14; G02F 1/0136; G02F 2001/0136
USPC ............. 353/8, 81, 20, 98; 348/57; 359/583, 359/629, 634, 251
See application file for complete search history.

(56) References Cited

U.S. PATENT DOCUMENTS

| | | |
|---|---|---|
| 4,630,097 A | 12/1986 | Marks |
| 4,870,486 A | 9/1989 | Nakagawa et al. |
| 5,113,285 A | 5/1992 | Franklin et al. |
| 5,168,199 A | 12/1992 | Huffman et al. |
| 5,420,484 A | 5/1995 | Morrish |
| 5,751,479 A | 5/1998 | Hamagishi et al. |
| 6,040,946 A | 3/2000 | Hebert |
| 6,327,093 B1 | 12/2001 | Nakanishi et al. |
| 6,344,927 B1 | 2/2002 | Itoh et al. |

(Continued)

FOREIGN PATENT DOCUMENTS

| | | |
|---|---|---|
| CN | 1624525 A | 6/2005 |
| CN | 1666269 A | 9/2005 |

(Continued)

OTHER PUBLICATIONS

Chen et al.; "Simple Multimode Stereoscopic Liquid Crystal Display"; Japanese Journal of Applied Physics; Part 2 (Letters); vol. 36; No. 12B; pp. L1685-L1688; Dec. 15, 1997.

(Continued)

*Primary Examiner* — Toan Ton
*Assistant Examiner* — Magda Cruz
(74) *Attorney, Agent, or Firm* — Cantor Colburn LLP; Steven Chiu

(57) ABSTRACT

A system is provided for projecting a three-dimensional image. The system includes a light source and a polarization conversion system for converting light emitted from the light source to circular polarization. A beam splitter device is disposed adjacent the light source to receive light, and an LCoS image device is disposed adjacent the beam splitter device.

15 Claims, 3 Drawing Sheets

(56) References Cited

U.S. PATENT DOCUMENTS

| | | |
|---|---|---|
| 6,359,664 B1 | 3/2002 | Faris |
| 6,672,722 B2 | 1/2004 | O'Connor et al. |
| 6,813,085 B2 | 11/2004 | Richards |
| 7,081,997 B2 | 7/2006 | Sedlmayr |
| 7,119,957 B2 | 10/2006 | Itoh et al. |
| 7,270,428 B2 | 9/2007 | Alasaarela et al. |
| 7,283,308 B2 | 10/2007 | Cossairt et al. |
| 7,401,923 B2 | 7/2008 | Fergason |
| 7,446,733 B1 | 11/2008 | Hirimai |
| 7,468,844 B2 | 12/2008 | Hall, Jr. |
| 7,477,220 B2 | 1/2009 | Muto |
| 7,561,322 B1 | 7/2009 | Maeda et al. |
| 7,649,915 B2 | 1/2010 | Fermann et al. |
| 7,692,605 B2 | 4/2010 | Tsao |
| 7,766,490 B2 | 8/2010 | Harbers et al. |
| 7,773,160 B2 | 8/2010 | Yamazaki et al. |
| 7,848,370 B2 | 12/2010 | Kewitsch et al. |
| 8,337,020 B2 | 12/2012 | Handschy et al. |
| 8,388,138 B1 | 3/2013 | Boothroyd |
| 2002/0191235 A1 | 12/2002 | O'Connor et al. |
| 2004/0109329 A1 | 6/2004 | Kato |
| 2004/0155207 A1 | 8/2004 | Kleinschmidt |
| 2004/0201879 A1 | 10/2004 | Shih et al. |
| 2004/0207879 A1 | 10/2004 | Bailey et al. |
| 2006/0187393 A1 | 8/2006 | Kuan et al. |
| 2006/0232845 A1 | 10/2006 | Harned et al. |
| 2006/0238716 A1 | 10/2006 | Lee et al. |
| 2006/0279662 A1 | 12/2006 | Kapellner et al. |
| 2006/0290889 A1 | 12/2006 | Robinson et al. |
| 2007/0035830 A1 | 2/2007 | Matveev et al. |
| 2007/0115230 A1 | 5/2007 | Tajiri et al. |
| 2007/0139519 A1 | 6/2007 | DeCusatis et al. |
| 2007/0139618 A1 | 6/2007 | DeCusatis et al. |
| 2007/0139769 A1 | 6/2007 | DeCusatis et al. |
| 2007/0146880 A1 | 6/2007 | Bleha et al. |
| 2007/0181834 A1 | 8/2007 | Kleinschmidt |
| 2007/0188863 A1 | 8/2007 | Sun et al. |
| 2007/0195408 A1 | 8/2007 | Divelbiss et al. |
| 2008/0018999 A1 | 1/2008 | Schuck et al. |
| 2008/0055550 A1 | 3/2008 | Kim |
| 2008/0094577 A1 | 4/2008 | Krijn et al. |
| 2008/0151193 A1 | 6/2008 | Reder |
| 2009/0040463 A1 | 2/2009 | Chen et al. |
| 2009/0086016 A1 | 4/2009 | Su |
| 2009/0141242 A1 | 6/2009 | Silverstein et al. |
| 2009/0180181 A1 | 7/2009 | Oakley |
| 2009/0207379 A1 | 8/2009 | Oakley |
| 2009/0231549 A1 | 9/2009 | Chen et al. |
| 2010/0039624 A1 | 2/2010 | Fujinawa et al. |
| 2010/0045938 A1 | 2/2010 | Lin et al. |
| 2010/0110386 A1* | 5/2010 | Handschy et al. ............ 353/20 |
| 2010/0141856 A1 | 6/2010 | Schuck et al. |
| 2010/0171909 A1 | 7/2010 | Handschy |
| 2010/0189344 A1 | 7/2010 | Maes |
| 2010/0208210 A1 | 8/2010 | Aastuen et al. |
| 2010/0238413 A1 | 9/2010 | Huang |
| 2010/0253769 A1 | 10/2010 | Coppeta et al. |
| 2011/0089315 A1 | 4/2011 | Walt et al. |
| 2011/0116051 A1 | 5/2011 | Young et al. |
| 2011/0149253 A1 | 6/2011 | Mihashi et al. |
| 2011/0204793 A1 | 8/2011 | Gardner, Jr. |
| 2011/0211168 A1 | 9/2011 | Kim et al. |
| 2012/0019529 A1 | 1/2012 | Kimpe |
| 2012/0287144 A1 | 11/2012 | Gandhi et al. |
| 2012/0307211 A1 | 12/2012 | Hofmann et al. |
| 2013/0077283 A1* | 3/2013 | Li ............................. 362/19 |
| 2013/0082994 A1 | 4/2013 | Al-Dahle |
| 2013/0147393 A1 | 6/2013 | Bazzani et al. |

FOREIGN PATENT DOCUMENTS

| | | |
|---|---|---|
| CN | 1721961 A | 1/2006 |
| CN | 1854810 A | 11/2006 |
| CN | 1885096 A | 12/2006 |
| CN | 101196615 A | 6/2008 |
| CN | 101364037 A | 2/2009 |
| CN | 101373054 A | 2/2009 |
| CN | 101482665 A | 7/2009 |
| CN | 101571631 A | 11/2009 |
| CN | 101625467 A | 1/2010 |
| CN | 101770150 A | 7/2010 |
| CN | 201576164 U | 9/2010 |
| CN | 102043254 A | 5/2011 |
| CN | 102089701 A | 6/2011 |
| CN | 102193239 A | 9/2011 |
| CN | 202057900 U | 11/2011 |
| CN | 102289141 A | 12/2011 |
| JP | 2000284223 A | 10/2000 |
| JP | 2001222064 A | 8/2001 |
| JP | 2007065408 A | 3/2007 |
| JP | 2008064809 A | 3/2008 |
| WO | 9952269 | 10/1999 |
| WO | 2005032150 A1 | 4/2005 |
| WO | WO 2005032150 A1 * | 4/2005 ............... H04N 9/31 |
| WO | 2008042615 A1 | 4/2008 |
| WO | 2010143891 A2 | 12/2010 |

OTHER PUBLICATIONS

Fergason et al.; An innovative beamsplitter-based stereoscopic/3D display design, Proceedings of SPIE—The International Society for Optical Engineering; vol. 5664; No. 1; pp. 488-494; Mar. 22, 2005.
Pezzaniti et al.; "Flat Panel 3D Display for Unmanned Ground Vehicles"; Proceedings of SPIE—The International Society for Optical Engineering; vol. 7332; pp. 73320N, 2009.
U.S. Appl. No. 13/357,719; Final Office Action; filed Jan. 25, 2012; Date Mailed: Jan. 27, 2014; pp. 1-37.
U.S. Appl. No. 13/673,462; Non-Final Office Action; filed Nov. 9, 2012; Date Mailed: Jan. 30, 2014; pp. 1-53.
U.S. Appl. No. 13/357,737; Notice of Allowance; filed Jan. 25, 2012; Date Mailed: Jan. 13, 2014; pp. 1-17.
U.S. Appl. No. 13/357,725; Notice of Allowance; filed Jan. 25, 2012; Date Mailed: Jan. 17, 2014; pp. 1-16.
U.S. Appl. No. 13/673,112; Non Final Office Action; filed Nov. 9, 2012; Date Mailed: Dec. 13, 2013; pp. 1-42.
U.S. Appl. No. 13/357,725; Notice of Allowance; filed Jan. 25, 2012; Date Mailed: Nov. 20, 2013; pp. 1-33.
U.S. Appl. No. 13/651,780; Notice of Allowance; filed Oct. 15, 2012; Date Mailed: Dec. 23, 2013 pp. 1-21.
International Application No. PCT/CN2013/070865; International Search Report and Written Opinion dated May 2, 2013, 14 pages.
International Application No. PCT/CN2013/070883; International Search Report and Written Opinion dated May 2, 2013, 12 pages.
International Application No. PCT/CN2013/070831; International Search Report and Written Opinion dated May 9, 2013, 11 pages.
International Application No. PCT/CN2013/070888; International Search Report and Written Opinion dated May 2, 2013, 11 pages.
International Application No. PCT/CN2013/070828; International Search Report and Written Opinion dated Apr. 25, 2013, 13 pages.
U.S. Appl. No. 13/672,877; Non Final Office Action; Date Filed: Nov. 9, 2012; Date Mailed: Oct. 3, 2013; pp. 1-24.
U.S. Appl. No. 13/672,980; Non Final Office Action; filed Nov. 9, 2012; Date Mailed: Nov. 8, 2013; pp. 1-41.
U.S. Appl. No. 13/357,737; Notice of Allowance; filed Jan. 25, 2012; Date Mailed: Nov. 22, 2013; pp. 1-56.
U.S. Appl. No. 13/672,947; Non Final Office Action; filed Nov. 9, 2012; Date Mailed: Nov. 26, 2013; pp. 1-40.
U.S. Appl. No. 13/357,704; Final Office Action; filed Jan. 25, 2012; Date Mailed: Oct. 30, 2013; pp. 1-23.
U.S. Appl. No. 13/357,704; Non Final Office Action; filed Jan. 25, 2012; Date Mailed: Jul. 15, 2013; pp. 1-24.
U.S. Appl. No. 13/357,719; Non Final Office Action; filed Jan. 25, 2012; Date Mailed: Jul. 26, 2013; pp. 1-33.
U.S. Appl. No. 13/357,725; Non Final Office Action; filed Jan. 25, 2012; Date Mailed: Jul. 15, 2013; pp. 1-28.
U.S. Appl. No. 13/357,707; Non Final Office Action; filed Jan. 25, 2012; Date Mailed: Feb. 4, 2014; pp. 1-56.
U.S. Appl. No. 13/357,715; Non Final Office Action; filed Jan. 25, 2012; Date Mailed: Feb. 26, 2014; pp. 1-40.

(56) References Cited

OTHER PUBLICATIONS

U.S. Appl. No. 13/651,715; Non Final Office Action; filed Oct. 15, 2012; Date Mailed: Feb. 5, 2014; pp. 1-52.
U.S. Appl. No. 13/651,780; Notice of Allowance; filed Oct. 15, 2012; Date Mailed: Feb. 28, 2014, pp. 1-14.
U.S. Appl. No. 13/673,112; Notice of Allowance; filed Nov. 9, 2012; Date Mailed: Apr. 30, 2014; pp. 1-24.
U.S. Appl. No. 14/051,477; Notice of Allowance; Date Filed: Oct. 11, 2013; Date Mailed: Oct. 9, 2014; 13 pages.
U.S. Appl. No. 13/357,707; Final Office Action: Date Filed: Jan. 25, 2014; Date Mailed: Jun. 12, 2014; 22 pages.
U.S. Appl. No. 13/673,462; Final Office Action; Date Filed: Nov. 9, 2012; Date Mailed: Jun. 12, 2014; 19 pages.
U.S. Appl. No. 13/357,719; Final Office Action; Date Filed: Jan. 25, 2012; Date Mailed: Jun. 19, 2014; pp. 1-44.
U.S. Appl. No. 14/051,477; Non-Final Office Action; Date Filed: Oct. 11, 2013; Date Mailed Jun. 20, 2014; 31 pages.
U.S. Appl. No. 13/672,947; Notice of Allownce; Date Filed: Nov. 9, 2012; Date Mailed: Apr. 30, 2014; pp. 1-23.
U.S. Appl. No. 13/672,877; Notice of Allowance; Date Filed: Nov. 9, 2012; Date Mailed: Jun. 25, 2014, pp. 1-11.

* cited by examiner

THREE DIMENSIONAL IMAGE PROJECTOR WITH CIRCULAR LIGHT POLARIZATION

BACKGROUND

The present invention relates to a stereoscopic three dimensional image projector, and more specifically, to a small three dimensional projector usable with passive glasses.

Three dimensional (3D) movies and pictures have become a popular form of entertainment due to the increased realism of the images. 3D images utilize the human physical trait of binocular vision. Human eyes are spaced about 2 inches (5 centimeters) apart therefore each eye sees the world from a slightly different perspective. The brain receives both images and has a binocular vision function that correlate the difference between what each eye sees to determine distance. The determination of the distance provides the three-dimensional effect that a person sees.

To create a binocular image on a two dimensional surface, such as a movie or television screen, the user typically wears glasses. The glasses alter the way that the user views the images to create the simulated 3D effect. Typically there are two types of glasses, passive glasses and active glasses. The type of glasses used will depend on the type of image projection system being used.

Passive glasses rely upon an optical effect created by using different lenses for each eye. The projection system emits a sequential series of images where subsequent images are slightly offset. The images are arranged such that the user sees the first image through a first lens of the glasses (e.g. the right eye) and the second image is seen with the other lens (e.g. the left eye). Since the images are projected quickly, the user does not notice the multiple images, but rather sees a three dimensional effect. Originally, passive glasses used different color lenses to filter out images, however this limited the use of 3D images when full color images are desired. To alleviate this issue, polarized lenses were developed where each lens of the glasses allowed the transmission of different polarized light. The polarized passive lenses allowed for full color 3D images to be transmitted. Passive lenses are more common with projector type systems, such as movie theaters for example, where multiple projectors may be used to project the images on a screen.

The development of 3D television systems created a new challenge as there typically isn't enough room for multiple projectors. To accommodate this, active lenses were created. With an active lens, the glasses wirelessly communicate with the projector to synchronize the glasses operation with the images being displayed. With active glasses, the lenses are typically liquid crystal displays that can switch between transmitting light and blocking light. In this way, the glasses may rapidly switch the left and right lenses between clear and opaque. While the glasses are switching, the television is projecting a series of sequential images. When this switching is synchronized between the television and the glasses, the user experiences a three dimensional effect.

Accordingly, while existing three dimensional projectors are suitable for their intended purpose a need for improvement remains, particularly in providing a system with a single projector that can project images viewable with passive glasses.

SUMMARY

According to one embodiment of the invention, a method is provided having a light source including a light emitting diode (LED) that emits a light. A polarization conversion system (PCS) is located adjacent the LED and has both a linear polarizer and a wave plate. The linear polarizer has an axis of polarization and the wave plate rotates between a first and second position. A polarizing beam splitter (PBS) is adjacent the light source and an imaging device is adjacent the PBS. The wave plate of the PCS is rotated to a first position, and a first light is emitted by the LED in the first light source. This first light is converted to circular polarization. This first light travels to the PBS where it is reflected onto the imaging device. The wave plate is then rotated to a second position, and a second light is emitted by the light source. This second light is converted to circular polarization and reflects from the PBS onto the imaging device.

SUMMARY

According to a light source is provided having a conic section reflector, an LED mounted on the conic section reflector, and a PCS adjacent the LED.

According to another embodiment of the present invention, a projector system is provided having a light source including a plurality of LEDs for emitting light. A PCS is located adjacent to each LED of the plurality of LEDs. A PBS is disposed adjacent the light source and an imaging device is adjacent the PBS.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Contemporary three-dimensional (3D) image projectors that use passive glasses typically use two projectors. Previous efforts to use only a single projector rely upon an active lens within the projector that switches between the sequential images. It should be appreciated that substantial costs may be involved in using redundant projectors or having a costly active lens. Further, these techniques do not scale well as users desire comparable performance from smaller and smaller projector packages.

A second type of projector uses active glasses having a liquid crystal diode (LCD) lens that coordinates with the projector (typically a television). The active glasses alternately block one of the lenses such that the user will see sequential images through alternating lenses. While active glasses perform well to create the 3D effect for the user, they also have some less desirable characteristics. The active glasses require an energy source such as a battery that needs to be periodically recharged or replaced. If the communication between the television and the glasses is interrupted, the 3D effect may be lost. Further, due to the complexity of the system, the active glasses tend to be much more costly.

Figure 1:
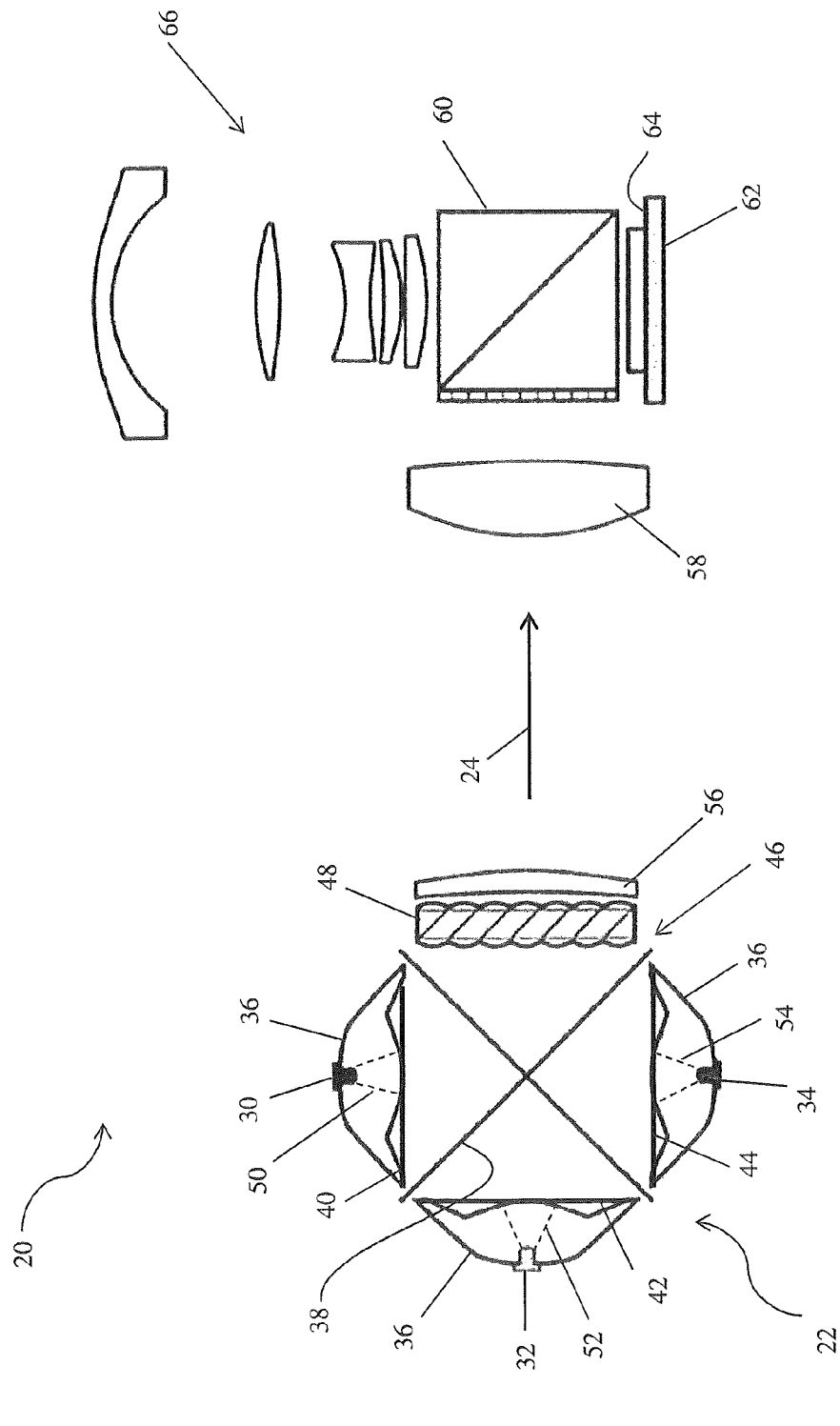
FIG. 1 is a schematic view of a three-dimensional image projector in accordance with an embodiment of the invention.

With reference now to FIG. 1, a 3D projector 20 is shown for projecting a three-dimensional (3D) image in accordance with an embodiment of the invention. The projector 20 includes a light source 22 having a plurality of light emitting diodes (LED) and which emits light in a direction indicated by arrow 24. In the exemplary embodiment, the light source includes three monochromatic LEDs, a red LED 30, a green LED 32 and a blue LED 34. The LEDs 30, 32, 34 are arranged to form three sides of a square and direct light toward the center of the light source 22. Adjacent each LED 30, 32, 34 within the light source 22 is a corresponding polarization conversion system (PCS) 40, 42, 44.

A PCS changes the polarization of a light passing through it. In an exemplary embodiment of the invention, each PCS converts the unpolarized light emitted by a respective LED into light having a circular polarization. Each PCS 40, 42, 44 may comprise a linear polarizer and a wave plate, such as a quarter wave plate. The linear polarizer is disposed adjacent the LED such that light emitted from the LED passes first through the linear polarizer and then through the wave plate. Each wave plate is rotatable about the optic axis of a corresponding LED between a first position and a second position. The first position and the second position are 90 degrees apart. The rotation of the wave plate is synchronized with the light emissions of a respective LED such that every time the LED flashes, the wave plate is oriented in either the first position or the second position. Light passing through a PCS with a wave plate in a first position will have a first circular polarization and light passing through a PCS with a wave plate in a second position will have a second circular polarization. In the exemplary embodiment of the present invention, the first circular polarization and the second circular polarization are opposite one another. An exemplary first position of a wave plate is when the wave plate is at a positive angle, such as 45 degrees, to the axis of polarization of the linear polarizer and an exemplary second position is when the wave plate is at an equivalent negative angle, for example negative 45 degrees, to the linear polarizer's axis of polarization. Additionally, the wave plates of each PCS 40, 42, 44 may be synchronized such that if more than one of the plurality of LEDs 30, 32, 34 in the light source flashes at once, the respective wave plates will be in the same first or second position with respect to each linear polarizer's axis of polarization. This oscillating orientation of the wave plate during sequential LED flashes creates alternating emissions of light having left-handed circular polarization and right-handed circular polarization.

Converting a light from linear polarization to circular polarization increases the angular width of the light beam. Conventional systems utilizing circular polarization usually suffer significant light loss and consequently, projected images are less bright. In the present invention, however, each LED 30, 32, 34 is mounted on a corresponding conic section reflector 50, 52, 54. These conic reflectors are designed to capture all of the angular rays from the light source, thereby reducing light loss and outputting a brighter image.

Each LED 30, 32, 34 may additionally be coupled to direct light into a light collection optic 36. The light collection optic 36 directs the then circularly polarized light exiting from each PCS 40, 42, 44 into a dichroic color combiner 38. The dichroic color combiner 38 combines light from the LED's to create a desired light color. The light from the light source 22 exits via an open side 46 and passes through a fly's eye lens 48 and a pre-polarizer lens 56. The fly's eye lens 42 consists of an array of lenslets that have the effect of breaking the transmitted light into many components and projecting them evenly over the field of view. The result is an even and bright illumination without any reduction in light intensity at the periphery of the projected light. The pre-polarizer lens 56 changes the polarization of the outgoing light to have a desired polarization characteristic that is suitable for the imaging device being used. Once the light leaves the pre-polarization lens 56, the light passes through a focusing lens 58 that focuses the light into a polarizing beam splitter (PBS) 60.

A PBS is an optical component that splits incident light rays into a first (transmitted) polarization component and a second (reflected) polarization component. Based on the polarization of the light as it enters the PBS, the light may either transmit through the PBS or reflect from the PBS along a path perpendicular to its original direction. As the light passes from the focusing lens 58 into the PBS 60, the light reflects from the PBS 60 onto an imaging device 62.

In the exemplary embodiment, the imaging device 62 is a liquid crystal on silicone (LCoS) type device that has an imaging surface 64 adjacent the PBS 60. In operation, the light from a light source 22 reflects off the PBS 60 onto the imaging device 62 which reflects the light back through the PBS 60, into a projection lens assembly 66, and out of the device 20. The use of an LCoS image device 62 provides advantages in that the LCoS device 62 inherently polarizes the reflected light.

In some embodiments, it should be appreciated that the combination of the light source 22, the multiple PCS devices 40, 42, 44, PBS 60, and LCoS device 62 provide advantages in reducing the size of the projector into the category of a pico-projector or micro-projector. These small projectors may be suitable to be used in a portable electronic device, such as but not limited to a cellular phone, a tablet computer, a laptop computer, and a hand-held gaming device for example. Embodiments of the present invention may also be used in non-portable devices, such as but not limited to a desktop computer or a television for example.

Figure 2:
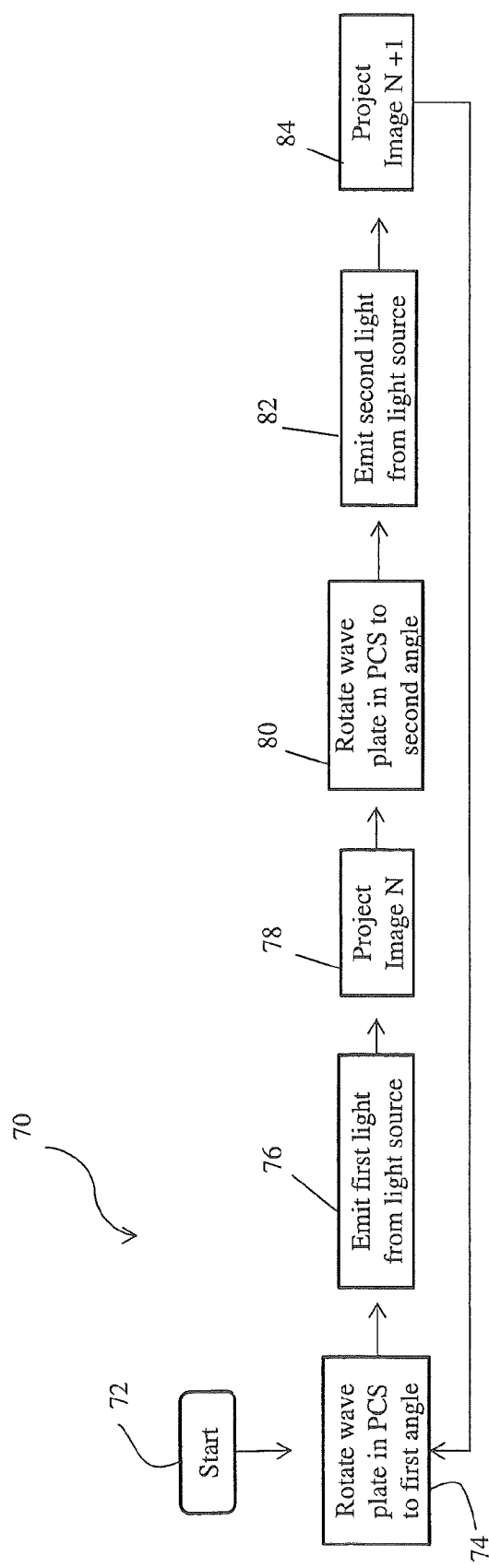
FIG. 2 is a flow chart for a method of operating a three-dimensional image projector in accordance with an embodiment of the invention; and, FIG. 3 is a flow chart for another method of operating a three-dimensional image projector in accordance with another embodiment of the invention.

Referring now to FIG. 2, a method 70 is shown for operating a three dimensional image projector, such as projector 20 for example. The method 70 starts in block 72 with rotating the wave plates of each of the polarization conversion systems (PCS) 40, 42, 44 within a light source to a first position. The method then emits a first light from the plurality of LEDs within the light source, such as light source 22, such that the light becomes circularly polarized. The first light emitted from the light source reflects off of the PBS 60 and onto an imaging device, such as LCoS 62 for example. The first light reflects off of the imaging device and through one or more lenses 66 to project an image N out of the projector 20 in block 76. Sequentially, the wave plates of PCS 40, 42, 44 rotate to a second position such that light passing through the PCS, will have an opposite circular polarization as light passing through the wave plates in the first position. In block 80, the light source emits a second light which is reflected off of PBS 60 and onto the imaging device 62. The second light reflects off of the imaging device 62 and through the projection lens assembly 66 to project an image N+1 out of the projector 20 in block 82. The method then loops back to block 72 to continue projecting images from the projector 20. It should be appreciated that images N and N+1 are similar but slightly offset with opposite polarizations to create a three-dimensional effect for a user wearing circularly polarized passive glasses.

Figure 3:
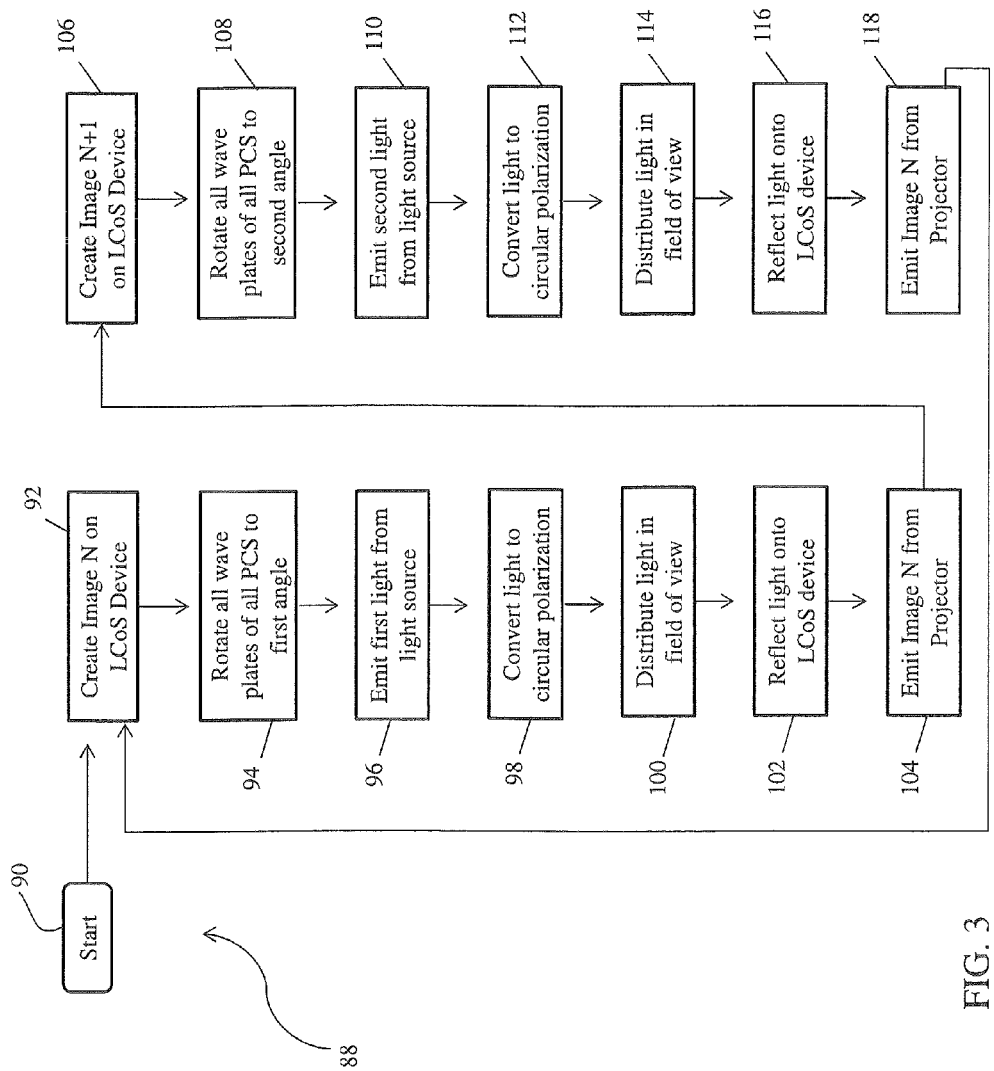

Referring now to FIG. 3, another embodiment of a method 88 is shown for operating a three dimensional image projector, such as projector 20 for example. The method 88 begins in start block 90 and proceeds to block 92 where an image "N" is created on an imaging device, such as imaging device 62. The wave plates of PCS 40, 42, 44 synchronize in a first position such that any light that passes through any of the PCS devices will become circularly polarized in a first direction. In block 96, at least one of the plurality of LEDs 30, 32, 34 within a light source, such as light source 22, emits a first light. This first light passes through the linear polarizer and the quarter wave plate of the corresponding PCS 40, 42, 44 so that the light is circularly polarized in a first direction. The first light is distributed, such as with a fly's eye lens, and directed through a pre-polarizing lens in block 100. The first light is then reflected off of a polarizing beam splitter, such as PBS 60, and onto the imaging device in block 102. The first light then reflects the image off of the imaging device and through a projecting lens to emit the image N from the projector in block 104.

The method 88 then proceeds to block 106 where an image N+1 is created on the imaging device. In block 108, the plurality of wave plates within PCS 40, 42, 44 are rotated to a second position such that any light that passes through any of the PCS devices will become circularly polarized in a second direction. The light source is activated in block 110 to emit a second light such that this second light passes through PCS 40, 42, 44 to become circularly polarized in a second, opposite direction. This second light is distributed and pre-polarized through the fly's eye lens and the pre-polarization lens in block 114. The second light then reflects off of the PBS 60 and onto the imaging device in block 116. The light reflecting off of the imaging device has a different polarization than the first light reflected from the imaging device. The second reflected light is transmitted through the projecting lens to emit image N+1 from the projector in block 118. It should be appreciated that the image N and the image N+1 are similar but slightly offset with opposite polarizations to create a three-dimensional effect for a user wearing circularly polarized passive glasses.

Embodiments of the present invention provide for a small, reliable three-dimensional projector. Embodiments of the present invention provide advantages of having multiple light sources that are arranged to have the same path length for projecting the image. Embodiments provide advantages in emitting a three-dimensional image usable with passive glasses.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A light source comprising:
   a conic section reflector;
   a light emitting diode (LED) mounted on the conic section reflector; and,
   a polarization conversion system (PCS) adjacent the LED, the PCS comprising a linear polarizer having an axis of polarization and a rotatable wave plate;
   wherein the rotatable wave plate rotates about an optic axis of the LED between a first position and a second position, the first position and the second position being 90 degrees apart.

2. The light source according to claim 1 wherein the rotatable wave plate is in the first position when the rotatable wave plate forms a 45 degree angle with the linear polarizer's axis of polarization.

3. The light source according to claim 1 wherein the rotatable wave plate is in the second position when the rotatable wave plate forms a negative 45 degree angle with the linear polarizer's axis of polarization.

4. The projector of claim 1 wherein the LED is configured to periodically emit light, and the wave plate is configured to be oriented in one of the first position and the second position when the light is emitted.

5. The projector of claim 4 wherein the wave plate is configured to sequentially create alternating light having left-handed circular polarization and right-handed circular polarization when light is emitted by the LED.

6. A projector comprising:
   a light source comprising a plurality of LEDs;
   a polarization conversion system (PCS) adjacent each of the plurality of LEDs, each PCS comprising a linear polarizer having an axis of polarization and a rotatable wave plate, wherein the rotatable wave plate rotates about an optic axis of an LED between a first position and a second position, the first position and the second position being 90 degrees apart;
   a polarizing beam splitter (PBS) adjacent the light source; and,
   an imaging device adjacent the PBS.

7. The projector system of claim 6 further comprising a projection lens assembly adjacent the PBS opposite the imaging device.

8. The projector of claim 7 wherein the plurality of LEDs are configured to periodically emit light, and each wave plate is configured to be oriented in one of the first position and the second position when the light is emitted.

9. The projector of claim 8 wherein each wave plate is configured to sequentially create alternating light having left-handed circular polarization and right-handed circular polarization when light is emitted by the LED.

10. The projector system of claim 6 wherein the light source comprises a plurality of conic section reflectors such that each of the plurality of LEDs is mounted on a conic section reflector.

11. The projector system of claim 6 wherein the rotatable wave plate is in the first position when the wave plate forms a 45 degree angle with the linear polarizer's axis of polarization.

12. The projector system of claim 6 wherein the rotatable wave plate is in the second position when the wave plate forms a negative 45 degree angle with the linear polarizer's axis of polarization.

13. The projector of claim 6 further comprising:
a fly's eye lens arranged between the light source and the PBS; and,
a pre-polarizer lens arranged between the fly's eye lens and the PBS.

14. The projector of claim 13 further comprising:
a plurality of light collection optics, each of the plurality of light collection optics associated with one of the plurality of LEDs; and,
a dichroic color combiner disposed between the plurality of light collection optics, the dichroic color combiner arranged to direct light from the plurality of LEDs into the fly's eye lens.

15. The projector according to claim 6, wherein the imaging device is an LCoS device.

* * * * *